J. L. DORMON.
PROCESS OF EXTRACTING VOLATILE AND FUSIBLE PRODUCTS FROM WOOD.
APPLICATION FILED OCT. 25, 1913.
1,122,084.
Patented Dec. 22, 1914.
3 SHEETS—SHEET 2.
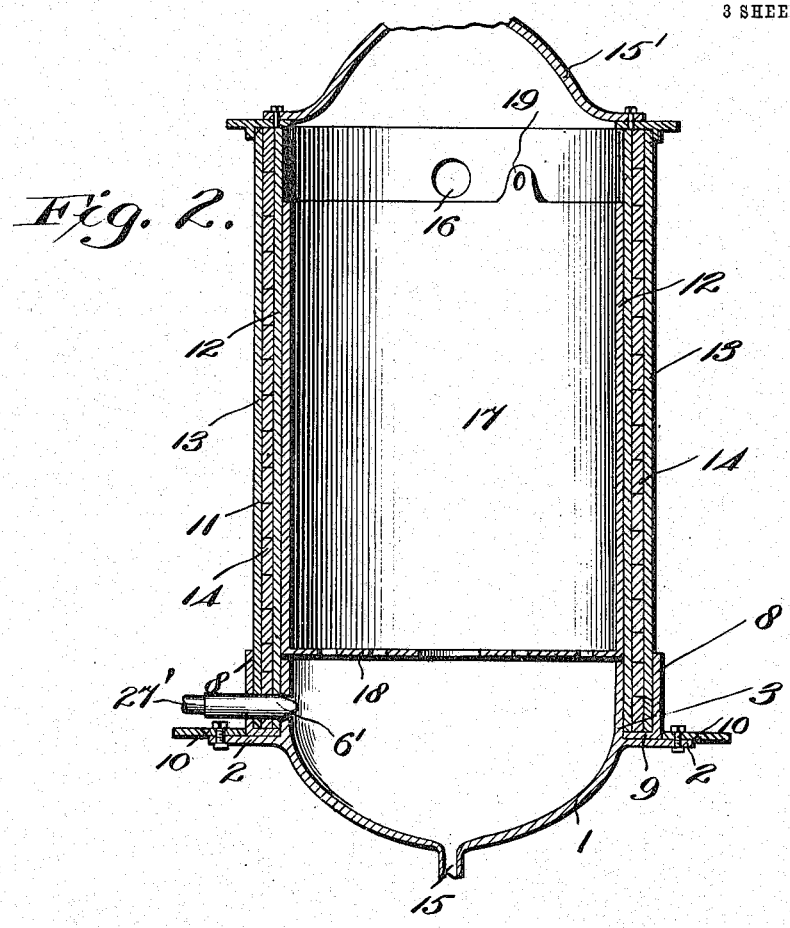
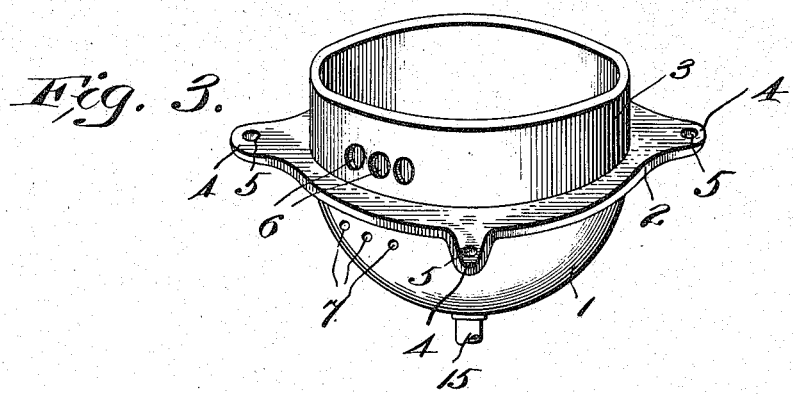

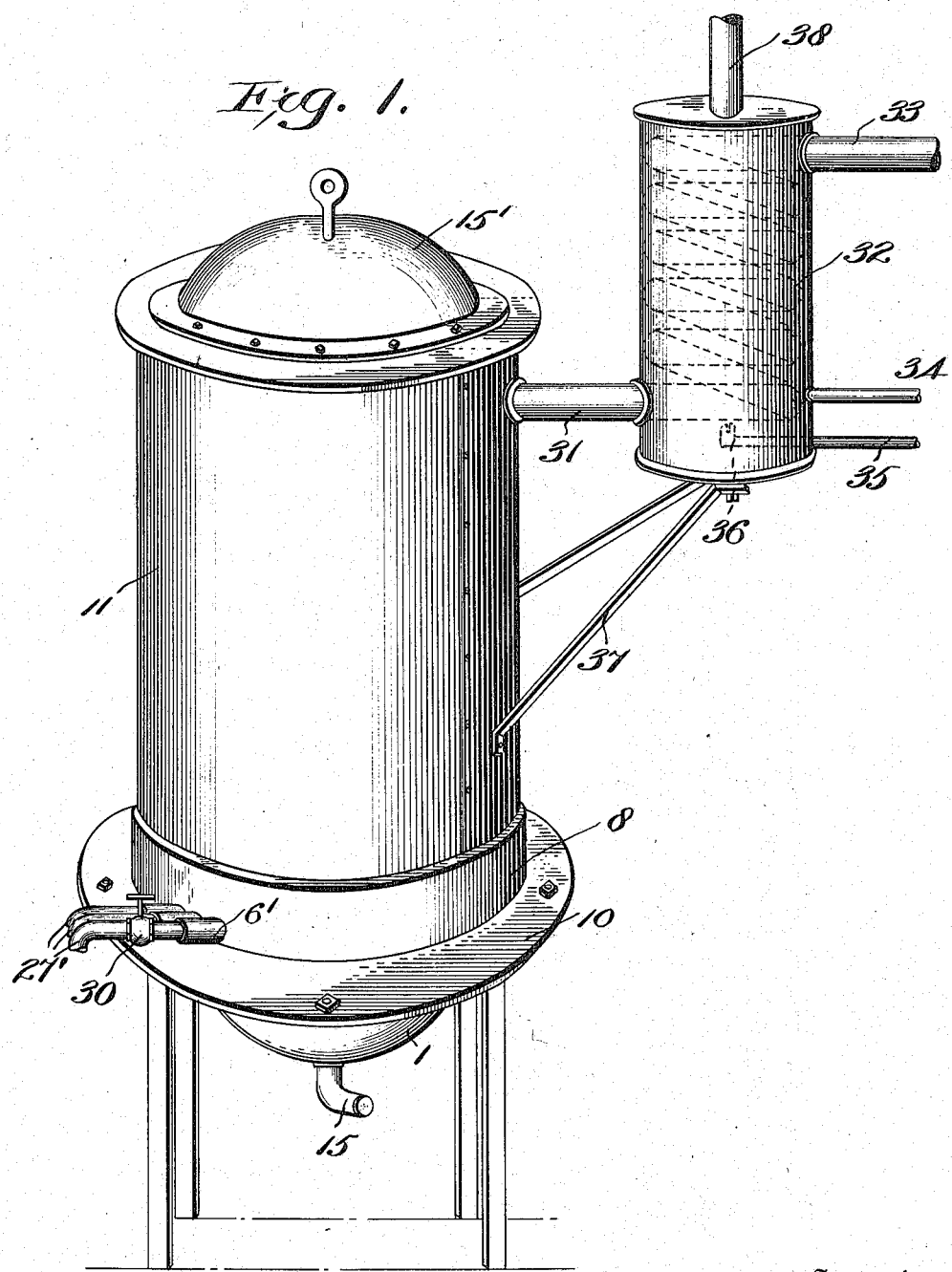

J. L. DORMON.
PROCESS OF EXTRACTING VOLATILE AND FUSIBLE PRODUCTS FROM WOOD.
APPLICATION FILED OCT. 25, 1913.
1,122,084.  
Patented Dec. 22, 1914.  
3 SHEETS—SHEET 3.
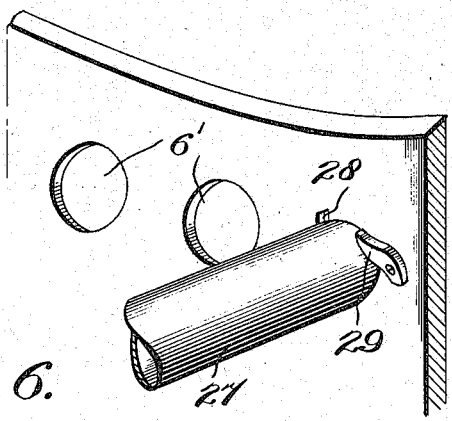
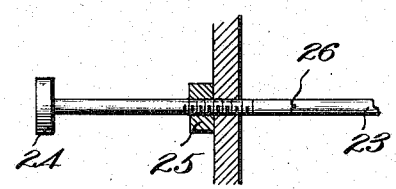
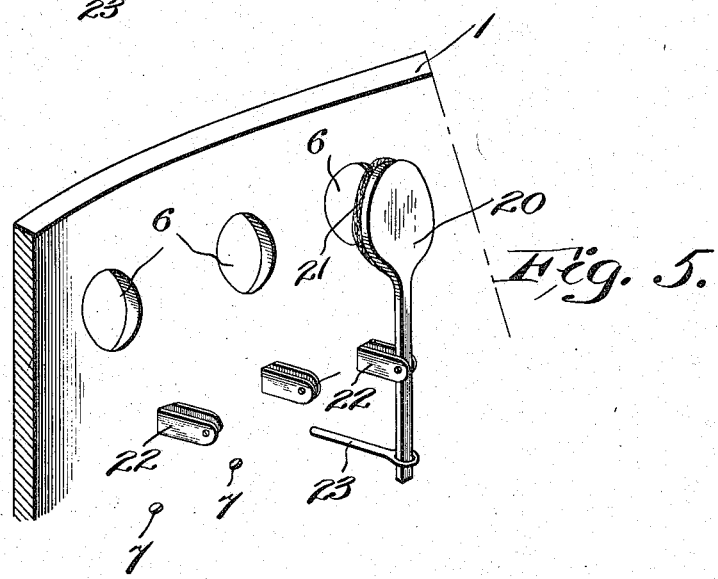
Witnesses  
Inventor  
James L. Dormon,  
by Wilkinson, Fisher & MacKaye  
Attorneys.

UNITED STATES PATENT OFFICE.

JAMES L. DORMON, OF NEW ORLEANS, LOUISIANA.

PROCESS OF EXTRACTING VOLATILE AND FUSIBLE PRODUCTS FROM WOOD.

1,122,084.  Specification of Letters Patent.  Patented Dec. 22, 1914.

Application filed October 25, 1913. Serial No. 797,300.

*To all whom it may concern:*

Be it known that I, JAMES L. DORMON, a citizen of the United States, residing at New Orleans, in the parish of Orleans and State of Louisiana, have invented certain new and useful Improvements in Processes of Extracting Volatile and Fusible Products from Wood; and I do hereby declare the following to be a full, clear, and exact description of the invention, such as will enable others skilled in the art to which it appertains to make and use the same.

My invention relates to a process of extracting from wood its volatile and fusible constituents.

It is particularly adapted for extracting from pine wood turpentine, wood spirits, resin, tar, pitch, etc.

One of the serious defects in one of the methods which has often been tried in the distillation of wood, that of applying fire heat to the exterior of a retort containing the wood, is that one portion of the charge becomes highly heated while other portions are cool, thus causing the mixing of such distillation products as creosote and spirits turpentine, which can not be perfectly separated by subsequent refining. Another objection to that method is that after the resin is melted out of the wood it comes in contact with highly heated surfaces and is broken up into other products. Moreover, a portion of the valuable products of distillation, while still in the state of vapor, are broken up into less valuable forms on account of coming into contact with highly heated surfaces. Again, wood being a poor conductor of heat, much time is consumed before the charge is heated throughout, and the output of a given apparatus in a given time is therefore reduced. Also in driving the heat to a point high enough to complete the process by the carbonization of the entire charge it is unavoidable that some portions of the retort will attain a temperature sufficiently high to materially shorten its life.

The object of my invention is to overcome these and other defects inherent in the above mentioned method and others which have been brought out from time to time, and thereby secure a larger yield of products and of better quality than can be obtained by the apparatus and processes now in use.

My invention relates to a process for obtaining these constituents separate from each other whereby their purity is assured and their commercial value enhanced. If my process be carried to its completion the final product is charcoal, that is, carbon, together with whatever mineral constituents or ash, the wood may possess. The volatile constituents which I obtain are each obtained at a certain temperature, and this temperature must be maintained nearly uniform. I aim to overcome these objections by distributing throughout the mass of wood in the retort or receptacle, currents of heated inert gas. The heat is thus distributed with practical uniformity throughout the chips or billets, or contents of the holder.

In my process the heating of the wood is accomplished by leading through the retort heated nitrogen, carbon dioxid, carbon monoxid, or hydrocarbon gases, or a mixture of one or more of these, either in a dry state or containing a portion of water vapor. By this means, as these heated gases are conducted through the retort they give up their heat to each individual piece of wood in the charge, and the time consumed in heating the entire charge, each piece through and through, to the pre-determined temperature, is only such time as is required for the heat to penetrate from the surface to the center of any one piece of wood.

After the charge of wood is placed in the retort, the heated gases at pre-determined temperatures are led through the charge until same is evenly heated, through and through, to the point which will cause the first product desired, to distil over and the charge is then held at this even, uniform temperature sufficiently long to distil off the product to be recovered at that temperature. While this has been done a pipe or conduit has been left open in the lower portion of the retort for the egress of this particular vapor, the other openings being closed; when the first product has been distilled off, this pipe is closed and the next opened, and the temperature of the gases is then raised to the point at which the next desired product will distil over, and held at that point, practically uniformly throughout the retort, until that product has distilled off and its vapor conducted away through the opening and pipe provided for it, to the condenser set apart for its condensation. Then the opening for the egress of that particular vapor is closed and the next one opened, and the gases raised to a higher temperature sufficient to distil off the next product desired, and so on and so on, successively, until all the different products desired have been fractionally distilled off from the charge of wood and only charcoal left in the retort.

During the period when any product is being distilled off the gases conducted through the retort are not heated to a point materially higher than the temperature proper for the distillation of that particular product, and the gases are conducted through the retort in sufficient volume and for a sufficient time to heat the charge to the proper temperature for that one product and held at that temperature sufficiently long for its proper distillation. This enables me to conduct a true fractional distillation of each desired product, direct from the charge of wood in the retort, instead of allowing one product to become contaminated with another, to its detriment, and then trying to annul the damage by subsequent re-distillation or refining.

In the proper operation of the process it is intended not only that each product shall be distilled off at its own proper temperature, but also, that as fast as formed its vapor shall be conducted away from the retort immediately without being allowed to come in contact with any heated surface and shall be conducted away through the opening and pipe provided for it and not used for any other vapor and finally condensed in a condenser provided solely for it and not used for any other product, so that not only will one product not become contaminated by mixing with another, but in addition, one product will not become deteriorated by coming in contact with a surface which has been contaminated by some other product, for instance, spirits turpentine will not be allowed to become contaminated by passing through a pipe through which vapors of creosote have passed.

The apparatus which I have devised for carrying out this process is shown in the accompanying drawings, in which:

Figure 1 is a general view of the retort with the heater attached. Fig. 2 is a sectional view of the retort and collecting bowl. Fig. 3 is a perspective of the collecting bowl. Fig. 4 is a fragmentary view of the manner of attaching pipes to the exterior of the retort. Fig. 5 is a view of the valves for closing and opening the retort; and Fig. 6 is a section showing the means for operating such valves.

I provide a bowl-shaped bottom 1, which has a supporting flange 2 and a neck 3. It is also provided with ears 4 having holes 5, as shown. The openings shown in Fig. 3 provide exits for the different gases of distillation, and their relation to the other parts of the device will be explained later.

Upon this bowl rests a rim 8, which has an inner flange 9 and an outer flange 10 made in one piece therewith or riveted, or brazed, or otherwise secured thereto. The outer flange 10 is provided with holes registering with the holes 5 in the ears of the bowl, whereby the two may be bolted together in fixed relation. Holes 6', corresponding to the holes 6 in the bowl, are also provided, and the two are assembled as shown in Fig. 2. There is thus a trough between the neck 3 and the rim 8, shown circular in shape, and in this trough is set the body of the still or retort. This consists of inner and outer walls 12 and 13, between which are placed blocks 14 of asbestos or brick, or of some other heat insulating material. The still or retort is provided with a top 15', which is removable and replaceable in any suitable manner. Legs riveted or otherwise secured to the flange 10 support the whole, but other means of support may obviously be used.

In the lower part of the bowl is a discharge opening or pipe 15, controlled by a plug or valve. In the upper part of the retort is an opening 16. A receptacle 17, fitting close to the interior of the retort, is provided with a perforated or reticulated bottom 18, and ears 19 whereby it may be lifted in or out. As shown in Fig. 2 its bottom rests on the upwardly extending neck 3; its upper edge must not rise above the holes or openings 16 in the upper part of the bowl. The retort has holes, not shown, which register with the holes 6 and 6' in the bowl and rim. These holes or openings are closed by valves 20, shown in Fig. 5, which are situated on the inside of the bowl, and below the bottom of the receiver or container. These valves, as shown, are provided with pads of asbestos or of other suitable material 21 and are pivoted in ears 22. Their position is determined by thrust or pressure on rod 23 provided on the outside with a milled handle 24, screw 25, and swivel 26, as shown, to effect seating and unseating of the valves. One valve is provided for each opening. Outside each opening, as seen in Fig. 4, is provided a sleeve 27. Each sleeve has a lug 28 which enters behind catch 29 pivoted on rim 8, and is thus locked or buttoned in place.

The distance from the lug 28 to the end of the sleeve is determined by the thickness of the seat of the sleeve, that is by the distance to which it enters the walls of the retort. The distance is such that when the sleeve is rotated, its lug catches behind the catch 29 and its inner end is forced or wedged against the bevel opening on neck 3. To each sleeve may be fitted a pipe 27'. Of course other means for securing the pipes in place may be provided. Valve 30 is provided for closing the exit to each pipe 27', only one valve being shown. Each pipe leads to a condenser or collector, not shown.

From the opening 16 in the upper part of the retort a pipe 31 is extended to the heater 32. The pipe 31 is coiled or otherwise made to return upon itself in the heater, and at 33 leads to a gas supply. The bottom of the heater is provided with two pipes 34 and 35, through one of which air is admitted and through the other gas is admitted. The gas pipe is shown terminating in a burner 36. Of course other means, as by coal or charcoal, or hot steam may be used for giving the desired temperature to the heater. The heater is shown supported on the bracket 37, and 38 is the exit pipe for the gases of combustion.

In carrying out my process I lead some non-oxidizing gas, usually one which is inert toward the wood or its contents, such as nitrogen, carbon monoxid, carbon dioxid, hydrogen, or some hydrocarbon, from a source of supply not shown, through the pipe 33 into and through the heater 32, through the pipe 31, downward through the retort, and out through one of the pipes 27, to a condenser.

I prefer, as I have said, to use inert gases. I may, however, use some gas or the vapor of some liquid which may have a solvent effect upon the constituents of the wood or upon some of them. In the condenser, the gas with its accompanying vapor is chilled to the liquefaction point of the particular distillate desired to be recovered. The inert gas thus relieved of the vapors may be used over again or may be stored up for other use. If a gas or vapor be employed which still carried with it some volatile constituents of the wood, not condensable, such vapor might be used for heating or lighting purposes. The temperature of the gas as it passes through the heater is proportioned to the distillate which it is desired to remove from the wood. Of course, the more refractory distillates come off last, so that the temperature of the heater, and consequently of the gas as it passes through, is raised not gradually, but step by step. At the same time that the gas passes through the retort and carries with it the vapors of volatile constituents, it serves to melt out the resin, and if the wood be pine, this is rosin, tar and pitch, and these trickle down and are collected and may be removed from the bottom of the bowl-shaped receiver. The first fusible commodity, if pine wood be treated, is rosin of the first grade. This is collected and removed. The next fusible product is rosin of the second grade. After this, tar and pitch may be successively gotten out and collected. By leading the heating gas from the top of the retort downward, I find that the distribution of the gas throughout the charge is made more uniform, since there is less disposition to form draft channels through the charge. Furthermore, the melting out of the rosin appears to be cleaner and more precise, probably due to the solvent effect of the rosin drops as they trickle down upon the unmelted rosin beneath, and to the contractile effort (due to surface tension) of the unmelted or partially melted rosin upon the completely melted rosin.

By making the retort vertical and introducing the heated gases at the top the charge is heated first at the top and thence on down to the bottom, which accomplishes two beneficial results:—(1) Heat has a tendency to drive the rosin ahead of it and by applying the heat first at the top and allowing it to extend thence to the bottom, this action tends to assist the action of gravity in collecting the rosin at the bottom of the retort so that it can be sooner drawn off and removed from the action of heat and thereby rosin of excellent quality can be obtained and, besides, less of it is converted into tar and pitch. (2) The hotter gases have a tendency to remain in the upper portion of the retort and the cooler ones in the lower portion, hence by this method, cross currents within the retort are prevented and the charge is heated more evenly and the vapors after being formed are sooner removed from the influence of heat, all of which results in obtaining a better product.

After all the valuable products have been distillated off from the charge, and only charcoal is left in the retort, the retort may be cooled by leading through it steam or inert gas, or by introducing a small quantity of water. It will, of course, cool itself in time, and it is equally obvious that the introduction of oxygen in any form must be avoided. After the charcoal is removed the bowl may be taken down and the apparatus cleaned out to avoid contamination by charcoal dust, or other dirt, of the turpentine or rosin of the succeeding charge.

While it is usually preferable to have the retort vertical, my invention also contemplates any arrangement of a retort whether vertical, inclined or horizontal. My invention also contemplates the passage of the gases by suction as well as by pressure. I may have several retorts arranged in batteries. I may have these batteries arranged either in series or in multiple. It will be obvious that the number of outlet pipes is determined by the number of volatile substances which it is desired to save.

What I claim and desire to secure by Letters Patent is:

1. A method of extracting volatile and fusible constituents from wood which consists in heating an inert gas to the temperature of volatilization of one of the constituents of said wood, and of fusion of another of the constituents of the said wood, passing said heated inert gas downward through the said wood until all of the constituents volatile at the temperature of the gas have been carried off and all of the constituents fusible at said temperature melted and collected, condensing the volatile constituents from the inert gas, and withdrawing the collected fused constituents.

2. A method of extracting volatilizable and fused constituents from wood which consists in passing an inert gas heated to a defined temperature through a mass of wood, condensing volatilized constituents, collecting fused constituents, passing the inert gas at a higher defined temperature through the same mass of wood, condensing the volatilized constituents, collecting the fused constituents, and continuing to raise the temperature of the passing gas by defined stages until all the volatile and fusible constituents of the wood have been removed, the passage of the gas in each stage being maintained until distillation and fusion are practically completed at such defined temperature.

3. The method of extracting volatilizable and fusible constituents from wood which consists in fractionally distilling such woods by passing through a mass of it a gas or gases at temperatures rising by successive stages, said stages of temperature being determined by the temperature of volatilization of certain of the ingredients of the wood and the fusibility of certain other ingredients, and condensing and collecting the volatilized and fused products, the passage of gas in each stage being maintained until distillation and fusion are practically complete at such defined temperature.

4. The method of extracting from pine wood, turpentine and rosin, which consists in passing through a mass of said wood, carbon dioxid, heated to the volatilizing temperature of turpentine, maintaining the passage of such carbon dioxid until all the turpentine has been volatilized, condensing the volatilized turpentine, and withdrawing the resin melted and collected in the passage of the heated gas, the passage of the carbon dioxid being maintained until distillation and fusion are practically complete at such defined temperature.

5. A method of extracting volatilizable and fusible constituents from wood which consists in passing an inert gas heated to a defined temperature through a mass of wood, condensing volatilized constituents, collecting fused constituents, passing the same gas downward at a higher defined temperature through the same mass of wood, condensing the volatilized constituents, collecting the fused constituents, and continuing to raise the temperature of the passing gas to defined stages until all the volatile and fusible constituents of the wood have been removed.

6. The method of extracting volatilizable and fusible constituents from wood which consists in fractionally distilling such woods by passing downward through a mass of it, a gas or gases at temperatures rising by successive stages, said stages of temperature being determined by the temperature of volatilization of certain of the ingredients of the wood and the fusibility of certain other ingredients and condensing and collecting the volatilized and fused products.

7. The method of extracting volatile and fusible constituents from resinous woods, which consists in heating an inert gas to a temperature sufficient to volatilize the lightest constituents of the wood and to fuse others, passing said gas downward through a mass of said wood and outward, condensing from said gas volatilizable constituents, collecting from said wood, constituents merely fused by the heat of the said inert gas, heating the said gas to a higher temperature, again passing, condensing and collecting, and repeating this until all volatilizable and fusible constituents are removed from the wood.

8. A method of extracting volatilizable and fusible constituents from wood which consists in passing a gas inert toward the wood being treated downward through the wood, heating the gas previous to its passage, condensing at separate stages volatile constituents of the wood carried off by the inert gas, and withdrawing the fused constituents released from the wood by the heat of said inert gas at different stages.

In testimony whereof, I affix my signature, in presence of two witnesses.

JAMES L. DORMON.

Witnesses:
DONELSON COPPERY,
JNO. A. WOGAND.